US010833853B2

(12) United States Patent
Chen et al.

(10) Patent No.: US 10,833,853 B2
(45) Date of Patent: Nov. 10, 2020

(54) METHOD AND DEVICE FOR SECURE COMMUNICATION

(71) Applicant: SZ DJI TECHNOLOGY CO., LTD., Shenzhen (CN)

(72) Inventors: Yongsen Chen, Shenzhen (CN); Peng Xie, Shenzhen (CN); Ridong Wan, Shenzhen (CN); Jun Wu, Shenzhen (CN); Ming Gong, Shenzhen (CN); Zhongqian You, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 140 days.

(21) Appl. No.: 16/003,978

(22) Filed: Jun. 8, 2018

(65) Prior Publication Data
US 2018/0295516 A1 Oct. 11, 2018

Related U.S. Application Data

(63) Continuation of application No. PCT/CN2015/097060, filed on Dec. 10, 2015.

(51) Int. Cl.
*H04W 12/06* (2009.01)
*H04L 9/08* (2006.01)
(Continued)

(52) U.S. Cl.
CPC .......... *H04L 9/0861* (2013.01); *H04L 9/0869* (2013.01); *H04L 9/14* (2013.01);
(Continued)

(58) Field of Classification Search
CPC ..... H04W 12/06; H04W 12/02; H04W 12/08; H04W 12/04; H04L 9/14; H04L 9/0861;
(Continued)

(56) References Cited

U.S. PATENT DOCUMENTS 10,073,449 B1* 9/2018 Sait .................. H04W 12/06
2004/0218762 A1* 11/2004 Le Saint ............ H04L 63/0421
380/277
(Continued)

FOREIGN PATENT DOCUMENTS

CN 1767429 A 5/2006
CN 1794626 A 6/2006
(Continued)

OTHER PUBLICATIONS

The World Intellectual Property Organization (WIPO) International Search Report for PCT/CN215/097060 dated Aug. 24, 2016 5 Pages (including translation).

*Primary Examiner* — Abu S Sholeman
(74) *Attorney, Agent, or Firm* — Anova Law Group, PLLC

(57) ABSTRACT

A secure communication method comprising obtaining a secret code generated in response to a first communication device being paired with a second communication device, obtaining a prestored product key, generating a module key based on the secret code and the product key, randomly generating a session key, obtaining a key sequence number, auto-incrementing the key sequence number, setting a sending sequence number with an initial value of zero, generating a key frame by performing a computation on the session key and a verification authentication code of the session key using the module key, sending a data packet including the key frame, the key sequence number, the sending sequence number, and a data type to the second communication device. The data type indicates that the data packet is a key data packet.

17 Claims, 6 Drawing Sheets

(51) Int. Cl.
  *H04L 9/14* (2006.01)
  *H04W 12/00* (2009.01)
  *H04L 9/32* (2006.01)
  *G06F 7/58* (2006.01)

(52) U.S. Cl.
  CPC ....... *H04L 9/3242* (2013.01); *H04W 12/0017* (2019.01); *H04W 12/06* (2013.01); *G06F 7/588* (2013.01); *H04L 2209/80* (2013.01); *H04L 2209/84* (2013.01)

(58) Field of Classification Search
  CPC . H04L 9/3242; H04L 9/0869; H04L 2209/84; H04L 2209/80; G06F 7/588
  See application file for complete search history.

(56) References Cited

U.S. PATENT DOCUMENTS

| | | | |
|---|---|---|---|
| 2007/0014403 A1* | 1/2007 | Loo | H04N 5/765 380/201 |
| 2007/0147621 A1* | 6/2007 | Barkan | H04L 9/14 380/286 |
| 2012/0284524 A1* | 11/2012 | Ho | H04L 9/0637 713/181 |
| 2014/0270166 A1 | 9/2014 | Avanzi et al. | |
| 2014/0304511 A1 | 10/2014 | Lewis et al. | |
| 2015/0339912 A1* | 11/2015 | Farrand | G08B 25/001 340/501 |
| 2018/0295516 A1* | 10/2018 | Chen | H04L 9/3242 |

FOREIGN PATENT DOCUMENTS

| | | |
|---|---|---|
| CN | 101286997 A | 10/2008 |
| CN | 101826960 A | 9/2010 |
| CN | 102769572 A | 11/2012 |
| CN | 103258152 A | 8/2013 |
| CN | 104023013 A | 9/2014 |
| CN | 104579562 A | 4/2015 |
| CN | 104641375 A | 5/2015 |

* cited by examiner

METHOD AND DEVICE FOR SECURE COMMUNICATION

CROSS-REFERENCE TO RELATED APPLICATION

This application is a continuation application of International Application No. PCT/CN2015/097060, filed on Dec. 10, 2015, the entire contents of which are incorporated herein by reference.

TECHNICAL FIELD

The present disclosure relates to secure authentication and secure communication technology for wireless communication and, more particularly, to a secure communication system and method for preventing replay attacks.

BACKGROUND

In secure communications, there are generally the following basic requirements.

1. Confidentiality: To ensure that communication data can only be interpreted by two communication devices.
2. Authentication: To ensure that the communication data is sent out by an authenticated party.
3. Preventing replay/playback attacks: To prevent attackers from recording previously sent data to fool a receiver. An attacker uses previous data or current data running in the system to deceive the receiver. Therefore, these two types of attacks need to be prevented during the system design.

Wireless communication systems are vulnerable to man-in-the-middle attacks (MITMs). For example, instructions are injected into the wireless system to control and hijack the receiver, wireless system data is modified to deceive the receiver, and the receiver is hijacked by the replay attacks, thereby (1) capturing an object being attacked to cause property loss of system owners; (2) manipulating the hijacked object to complete some malicious attacks to cause the loss of life and property of others.

Currently, the wireless communication systems are prone to be attacked due to lack of data protection and effective authentication of both communication devices. Even if the encryption and authentication are added in the system, the system is hijacked due to lack of effective prevention of replay attacks.

In one-way communication systems, the above problems are particularly prominent. In two-way communication systems, the above problems also exist.

SUMMARY

In accordance with the disclosure, there is provided a secure communication method. A secret code generated in response to a first communication device being paired with a second communication device and a prestored product key are obtained. A module key is generated based on the secret code and the product key. A session key is randomly generated. A key sequence number is obtained and auto-incremented. A sending sequence number with an initial value of zero is set. A key frame is generated by performing a computation on the session key and a verification authentication code of the session key using the module key. A data packet including the key frame, the key sequence number, the sending sequence number, and a data type is sent to the second communication device. The data type indicates that the first data packet is a key data packet.

Also in accordance with the disclosure, there is provided a secure communication method. A sending sequence number is obtained by a first communication device. The sending sequence number is auto-incremented. Instruction data to be sent is obtained. An instruction data frame is generated by encrypting the instruction data and a verification authentication code of the instruction data using a session key that is randomly generated. A data packet including the instruction data frame, the sending sequence number, and a data type is sent to a second communication device. The data type indicates that the data packet is an instruction data packet.

Also in accordance with the disclosure, there is provided a communication device including an authentication sending circuit configured to encrypt a randomly generated session key using a module key to generate an encrypted session key, and send the encrypted session key to another communication device.

DESCRIPTION OF MAIN COMPONENTS AND REFERENCE NUMERALS

Figure 1:
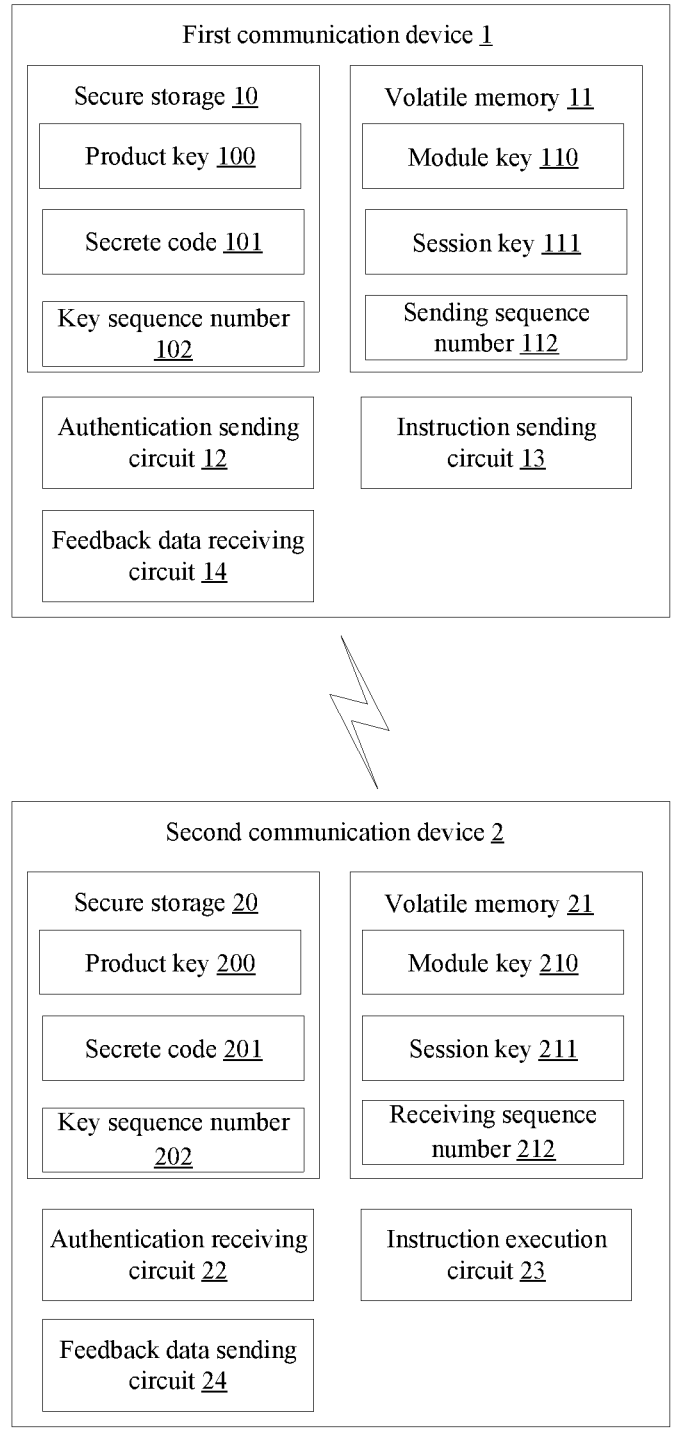
FIG. 1 is a schematic diagram of a hardware architecture of a secure communication system according to an embodiment of the disclosure.

First communication device 1
Secure storage 10
Product key 100
Secrete code 101
Key sequence number 102
Volatile memory 11
Module key 110
Session key 111
Sending sequence number 112
Authentication sending circuit 12
Instruction sending circuit 13
Feedback data receiving circuit 14
Second communication device 2
Secure storage 20
Product key 200
Secrete code 201
Key sequence number 202
Volatile memory 21
Module key 210
Session key 211
Sending sequence number 212
Authentication receiving circuit 22
Instruction execution circuit 23
Feedback data sending circuit 24

DETAILED DESCRIPTION OF THE EMBODIMENTS

Exemplary embodiments will be described with reference to the accompanying drawings.

FIG. 1 is a schematic diagram of a hardware architecture of a secure communication system 1000 consistent with the disclosure.

As shown in FIG. 1, the secure communication system 1000 includes communication apparatuses that communicate via a wireless network, such as a first communication device 1 and a second communication device 2. The first communication device 1 and the second communication device 2 can be a message sender and a message receiver, respectively, of a one-way communication system, or a master and a slave, respectively, of an asymmetric two-way communication system. For example, the first communication device 1 can be a flight controller, such as a remote controller, or the like, and the second communication device 2 can be an unmanned aerial vehicle (UAV), or a camera, a gimbal, or the like, provided on the UAV.

In some embodiments, each of the first communication device 1 and the second communication device 2 can be both a message sender and a message receiver. For example, the first communication device 1 and the second communication device 2 can be two UAVs, two cameras of the UAV, or the like.

The first communication device 1 includes one or more secure storages 10 and one or more volatile memories 11. The one or more secure storages 10 can include a read-only memory (ROM) of the first communication device 1 or another type of non-volatile memory, such as an erasable programmable read only memory (EPROM), a Flash Memory, a floppy disk, a hard disk, a magnetic disk, a compact disc, a SmartMedia Card (SM) card, a CompactFlash (CF) card, an eXtreme Digital (XD) card, a Secure Digital (SD) card, a MultiMediaCard (MMC), a SONY memory stick, an embedded MultiMediaCard (eMMC), a NAND, or the like. The one or more volatile memories 11 can include a Random-Access Memory (RAM) including a static RAM (SRAM), a dynamic RAM (DRAM), or the like.

In some embodiments, when the first communication device 1 is in production, a product key 100 can be assigned, which can be burned or cured in the one or more secure storages 10 of the first communication device 1, such as the ROM.

Similarly, the second communication device 2 also includes one or more secure storages 20 and one or more volatile memories 21. Accordingly, a product key 200 is also stored in the one or more secure storages 20 of the second communication device 2. The product key 200 is the same as the product key 100.

Furthermore, the first communication device 1 also includes an authentication sending circuit 12 and an instruction sending circuit 13.

The authentication sending circuit 12 can be configured to send a multi-layered encrypted key data packet to the second communication device 2 to perform security authentication between the first communication device 1 and the second communication device 2. The instruction sending circuit 13 can be configured to send a multi-layered encrypted instruction data packet to the second communication device 2, so as to send the instruction data to the second communication device 2.

The authentication sending circuit 12 and the instruction sending circuit 13 can prevent replay attacks during communication. Details will be described below with reference to FIG. 2.

Furthermore, the second communication device 2 also includes an authentication receiving circuit 22 and an instruction execution circuit 23.

The authentication receiving circuit 22 can be configured to receive the key data packet sent by the first communication device 1 and authenticate the first communication device 1. The instruction execution circuit 23 can be configured to receive the instruction data packet sent by the first communication device 1 to execute an instruction sent by the first communication device 1.

Figure 2:
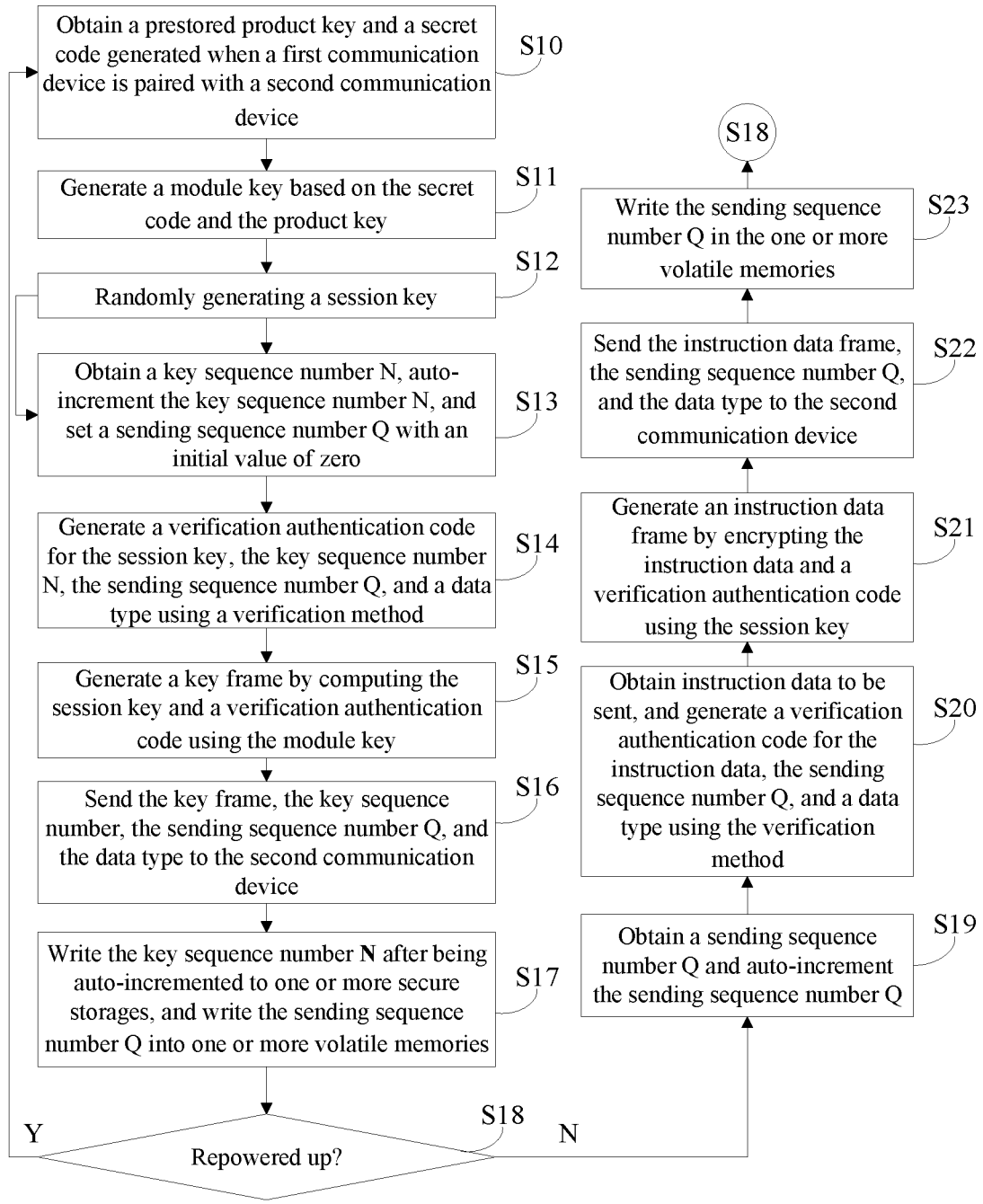
FIG. 2 is a flowchart of a data processing method of a sender of a one-way communication system according to an embodiment of a secure communication method.

FIG. 2 is a flowchart of a data processing method of a sender of a one-way communication system consistent with a secure communication method of the disclosure.

In some embodiments, the sender can be the first communication device 1. According to different needs, the execution sequence of the processes in the data processing method shown in FIG. 2 can be changed, and some processes can be omitted. It is not intended to limit the processes and sequence to those shown in FIG. 2.

At S10, when the first communication device 1 is booted or is powered up and restarted, the authentication sending circuit 12 of the first communication device 1 obtains a secret code 101 that is generated and written to the one or more secure storages 10 when the first communication device 1 is paired with the second communication device 2, and a prestored product key 100 from the one or more secure storages 10.

In some embodiments, the pairing process between the first communication device 1 and the second communication device 2 can be generally performed in a safe environment to ensure the security of the secret code 101. The pairing process can be a frequency matching process between the UAV and the remote controller.

At S11, the authentication sending circuit 12 obtains a module key 110 based on the secret code 101 and the product key 100.

In some embodiments, the authentication sending circuit 12 can perform, for example, a derivation algorithm, on the secret code 101 and the product key 100 to generate the module key 110. The derivation algorithm can include an encryption, a hashing, a Message Authentication Code (MAC), or any combination thereof. In some embodiments, the module key 110 can be generated only once at power-up. Therefore, the authentication sending circuit 12 can store the module key 110 in the one or more volatile memories 11 to improve security.

At S12, the authentication sending circuit 12 randomly generates a session key 111. The session key 111 can be dynamically generated by using a random number generator or another method of generating a random number. The session key 111 can also be generated only once at power-up. Therefore, the authentication sending circuit 12 can store the session key 111 in the one or more volatile memories 11.

At S13, the authentication sending circuit 12 obtains a key sequence number N 102 from the one or more secure storages 10, auto-increments the key sequence number N 102, and sets a sending sequence number Q 112 with an initial value of zero.

In some embodiments, an initial value of the key sequence number N 102 can be set to zero or another value, and can be auto-incremented each time the session key 111 is generated, for example, incremented by one. Therefore, the authentication sending circuit 12 can store the key sequence number N 102 in the one or more secure storages 10, such that the key sequence number N 102 can be retrieved after a power failure. When the session key 111 is changed, the sending sequence number Q 112 can be reset to zero. When the session key 111 is not changed, the sending sequence number Q 112 can be monotonically increased. Therefore, the authentication sending circuit 12 can store the sending sequence number Q 112 in the one or more volatile memories 11. The method of increasing the sending sequence number Q 112 can include that a value of Q is incremented by one each time a message is sent to the second communication device 2 or the value of Q is incremented by one every period of time, such as every 50 milliseconds or every 1 second. In some embodiments, the key sequence number N 102 can also be stored in the one or more volatile memories 11, such that the authentication sending circuit 12 can obtain the key sequence number N 102 from the one or more volatile memories 11.

At S14, the authentication sending circuit 12 generates a verification authentication code for the session key 111, the key sequence number N 102, the sending sequence number Q 112, and a data type using a verification method. The verification method can include a message digest algorithm, such as various hashes, including the message digest 5 (MD5), the Secure Hash Algorithm (SHA), or the like, a check code, such as a cyclic redundancy check (CRC) or the like, or a message authentication code. The data type can be a character representing a type of authentication data.

At S15, the authentication sending circuit 12 computes the session key 111 and the verification authentication code of the session key 111 using the module key 110 to generate a key frame.

In some embodiments, the computation can include: (1) computing the verification code (or a digest) of an original message and encrypting the session key 111 and the verification code (or the digest) by using the module key 110, (2) computing the MAC of the original message and encrypting the session key 111 by using the module key 110.

At S16, the authentication sending circuit 12 sends the key frame, the key sequence number N 102, the sending sequence number Q 112, and the data type to the second communication device 2.

In some embodiments, for the one-way communication system, the authentication sending circuit 12 can send the key frame, the key sequence number N 102, the sending sequence number Q 112 and the data type to the second communication device 2 once every period of time, for example, every 1 second, to ensure that the second communication device 2 can receive the key frame.

At S17, the authentication sending circuit 12 writes the auto-incremented key sequence number N 102 into the one or more secure storages 10 and writes the sending sequence number Q 112 into the one or more volatile memories 11.

In some embodiments, the sending sequence number Q 112 can be written into the volatile storage, which can ensure timely erasing the sending sequence number Q 112 and the security of information. If the sending sequence number Q 112 is stored in the one or more secure storage 10, encryption or another mean may be needed to ensure adequate security of information.

At S18, the authentication sending circuit 12 determines whether the first communication device 1 is repowered up. If the first communication device 1 is repowered up, the above processes at S10 to S17 are repeatedly performed. If the first communication device 1 is not repowered up, the process at S19 described below will be executed.

At S19, the instruction sending circuit 13 of the first communication device 1 obtains the sending sequence number Q 112 from the one or more volatile memories 11 and auto-increments the sequence number Q 112.

In some embodiments, the method of increasing the sending sequence number Q 112 can include that the value of Q is incremented by one each time a message is sent to the second communication device 2 or the value of Q is incremented by one every period of time, such as every 50 milliseconds or every 1 second.

At S20, the instruction sending circuit 13 obtains instruction data to be sent, and generates a verification authentication code for the instruction data, the sending sequence number Q 112, and a data type. The instruction data can include, for example, controlling a rotation direction, a rotation angle, or the like, of a camera of the UAV. The verification method can include the message digest algorithm, such as various hashes including the MD5, the SHA, or the like, a check code, such as CRC or the like, or a message authentication code. The data type can be a character representing a type of authentication data.

At S21, the instruction sending circuit 13 computes the instruction data and the verification authentication code of the instruction data using the session key 111 stored in the one or more volatile memories 11 to generate an instruction data frame. The computation can include an encryption algorithm, a message authentication code, or the like.

At S22, the instruction sending circuit 13 sends the instruction data frame, the sending sequence number Q 112, and the data type to the second communication device 2.

At S23, the instruction sending circuit 13 writes the sending sequence number Q 112 to the one or more volatile memories 11.

In some embodiments, the product key 110, the session key 111, the key sequence number N 102 and the sending sequence number Q 112 can also be stored in the secure storage of the remote controller or the UAV.

In some embodiments, circuits performing the above-described processes can be combined or split, as long as the key exchange and the communication function can be realized.

Figure 3:
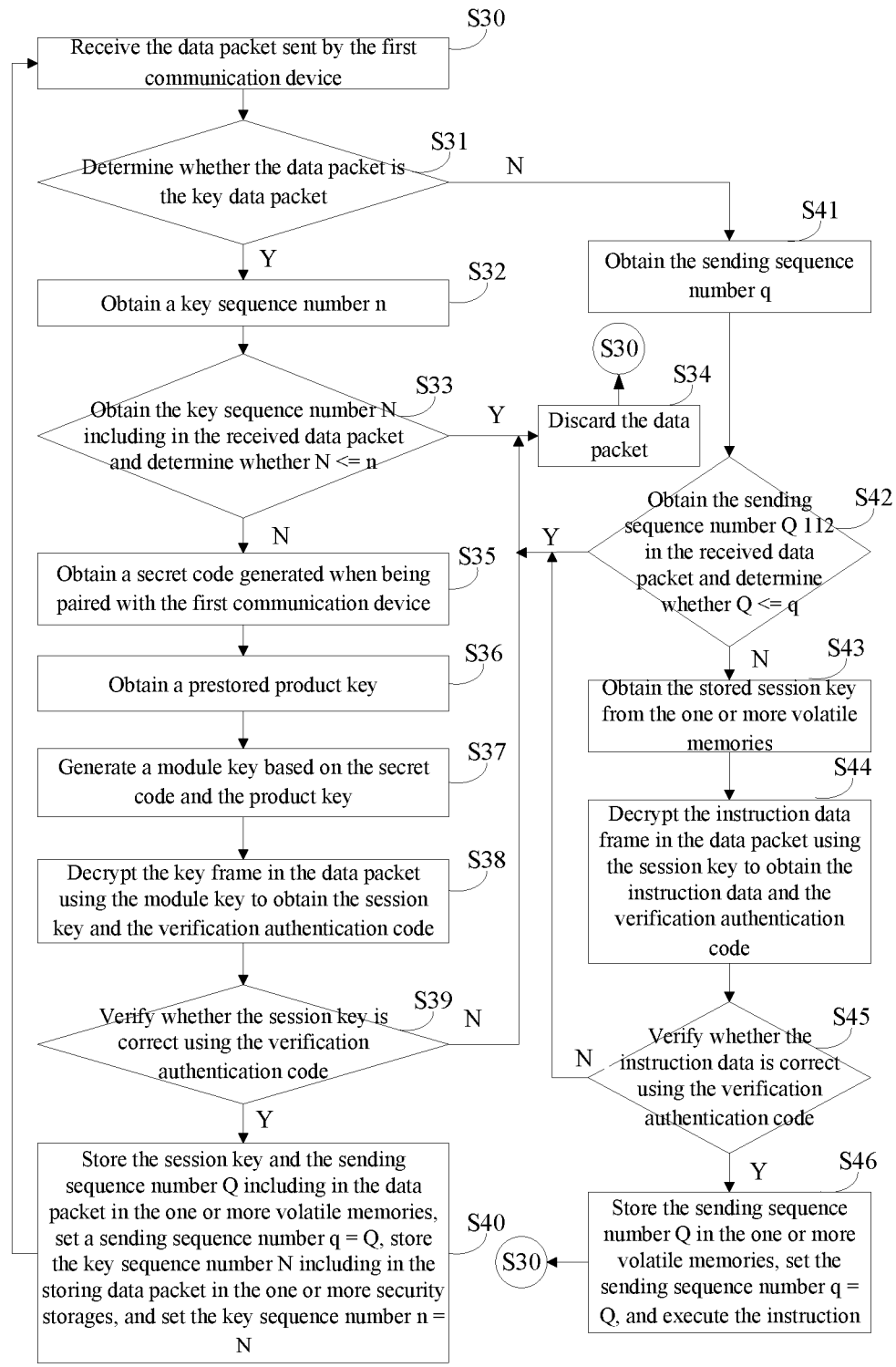
FIG. 3 is a flowchart of a data processing method of a receiver of the one-way communication system according to an embodiment of the secure communication method.

FIG. 3 is a flowchart of a data processing method of a receiver of the one-way communication system consistent with the secure communication method of the disclosure.

In some embodiments, the receiver can be the second communication device 2. According to different needs, the execution sequence of the processes in the data processing method shown in FIG. 3 can be changed, and some processes can be omitted. It is not intended to limit the processes and sequence to those shown in FIG. 3.

At S30, the second communication device 2 receives the data packet sent by the first communication device 1.

At S31, the second communication device 2 determines whether the data packet is the key data packet.

In some embodiments, the authentication receiving circuit 22 determines whether the data packet is the key data packet according to the data type included in the data packet. If the data packet is the key data packet, the processes at S32 to S40 described below will be executed. If the data packet is determined to be the instruction data packet according to the data type included in the data packet, the processes at S42 to S46 described below will be executed.

At S32, the authentication receiving circuit 22 of the second communication device 2 obtains a key sequence number n 202 from the one or more secure storages 20 of the second communication device 2.

At S33, the authentication receiving circuit 22 obtains the key sequence number N 102 included in the received data packet and determines whether N<=n. If N<=n, it indicates that the data packet may be the same as a data packet previously sent by the first communication device 1 or the packet may be sent by the attacker through the replay attack. The process at S34 will be executed. At S34, the authentication receiving circuit 22 discards the data packet. Otherwise, if N>n, the process at S35 described below will be executed.

In some embodiments, because the key sequence number N 102 can be generated each time the session key 111 is generated, the key sequence number N 102 can remain unchanged in a same session. Therefore, if N<=n, it indicates that the attacker may have used data running in a previous session to perform the replay attack. As such, the replay attack by the attacker using the data of the previous session can be prevented by comparing the key sequence number N 102 with the key sequence number n 202.

At S35, the authentication receiving circuit 22 obtains a secret code 201 that is generated and written into the one or more secure storages 20 when the second communication device 2 is paired with the first communication device 1. The secret code 201 is the same as the secret code 101 of the first communication device 1 described above.

At S36, the authentication receiving circuit 22 obtains a prestored product key 200 from the one or more secure storages 20. The product key 200 is the same as the product key 100 of the first communication device 1 described above.

At S37, the authentication receiving circuit 22 generates a module key 210 based on the secret code 201 and the product key 200.

In some embodiments, the authentication receiving circuit 22 can perform, for example, a derivation algorithm, on the secret code 201 and the product key 200 to generate the module key 210. The derivation algorithm can include an encryption or a MAC. The authentication receiving circuit 22 can store the module key 210 in the one or more volatile memories 21.

At S38, the authentication receiving circuit 22 decrypts the key frame in the data packet using the module key 210 to obtain the session key 111 and the verification authentication code including in the data packet.

At S39, the authentication receiving circuit 22 verifies whether the session key 111 is correct by using the verification authentication code. If the session key 111 is not correct, the above process at S34 will be executed and the data packet will be discarded. Otherwise, if the session key 111 is correct, the process at S40 described below is executed.

At S40, the authentication receiving circuit 22 stores the session key 111 and the sending sequence number Q 112 included in the data packet in the one or more volatile memories 21, sets a sending sequence number q=Q, stores the key sequence number N 102 including in the storing data packet in the one or more security storages 20, and sets the key sequence number n=N. As such, the second communication device 2 obtains the session key 111 sent by the first communication device 1 and completes the key exchange process.

In some embodiments, the process of determining the data type of the data packet at S31 can be omitted. At power-up or reboot, the key data packet can be sent after the session key is generated. After receiving the key data packet, if the receiver succeeds in receiving the key data packet, the receiver returns success information, and if unsuccessful, the sender may need to resend the data packet until the receiver succeeds. All of follow-up data packets may be considered to be the instruction data packets.

If the received data packet is the instruction data packet, the process at S41 described below will be executed.

At S41, the instruction execution circuit 23 of the second communication device 2 obtains the sending sequence number q 212 from the one or more volatile memories 21.

At S42, the instruction execution circuit 23 obtains the sending sequence number Q 112 in the received data packet and determines whether Q<=q. If Q<=q, it indicates that the data packet may be the same as a data packet previously sent by the first communication device 1 or the packet may be sent by the attacker through the replay attack. The process at S34 will be executed and the instruction execution circuit 22 will discard the data packet. Otherwise, if Q>q, the process at S43 described below will be executed.

At S43, the instruction execution circuit 23 obtains the stored session key 211 from the one or more volatile memories 21.

At S44, the instruction execution circuit 23 decrypts the instruction data frame in the data packet using the session key 211 to obtain the instruction data and the verification authentication code.

At S45, the instruction execution circuit 23 verifies whether the instruction data is correct using the verification authentication code. If the instruction data is incorrect, the above process at S34 will be executed and the instruction execution circuit 23 will discard the data packet. If the instruction data is correct, the process at S46 described below will be executed.

At S46, the instruction executing circuit 23 stores the sending sequence number Q 112 in the one or more volatile memories 21, sets the sending sequence number q=Q, and executes the instruction, for example, controlling the rotation direction, the rotation angle, or the like, of the camera of the UAV.

When the processes shown in FIG. 3 are being executed, if an abnormality occurs on the second communication device 2, for example, restart after a power failure, a key re-exchange with the first communication device 1 may be needed. The implementation method for the key re-exchange can include that the first communication device 1 can be also repowered up or, in a case of two-way communication, the second communication device 2 can actively request the first communication device 1 to perform the key re-exchange.

In some embodiments, if there is a power failure or restart abnormality of the second communication device 2, one of two solutions can be selected. The first communication device can be restarted, such that the first communication device 1 and the second communication device 2 can resume the key exchange. If there is a return link from the second communication device 2 to the first communication device 1, then after restarting, the second communication device 2 can send a request to request the first communication device 1 to resend the session key or the key data packet.

Figure 4:
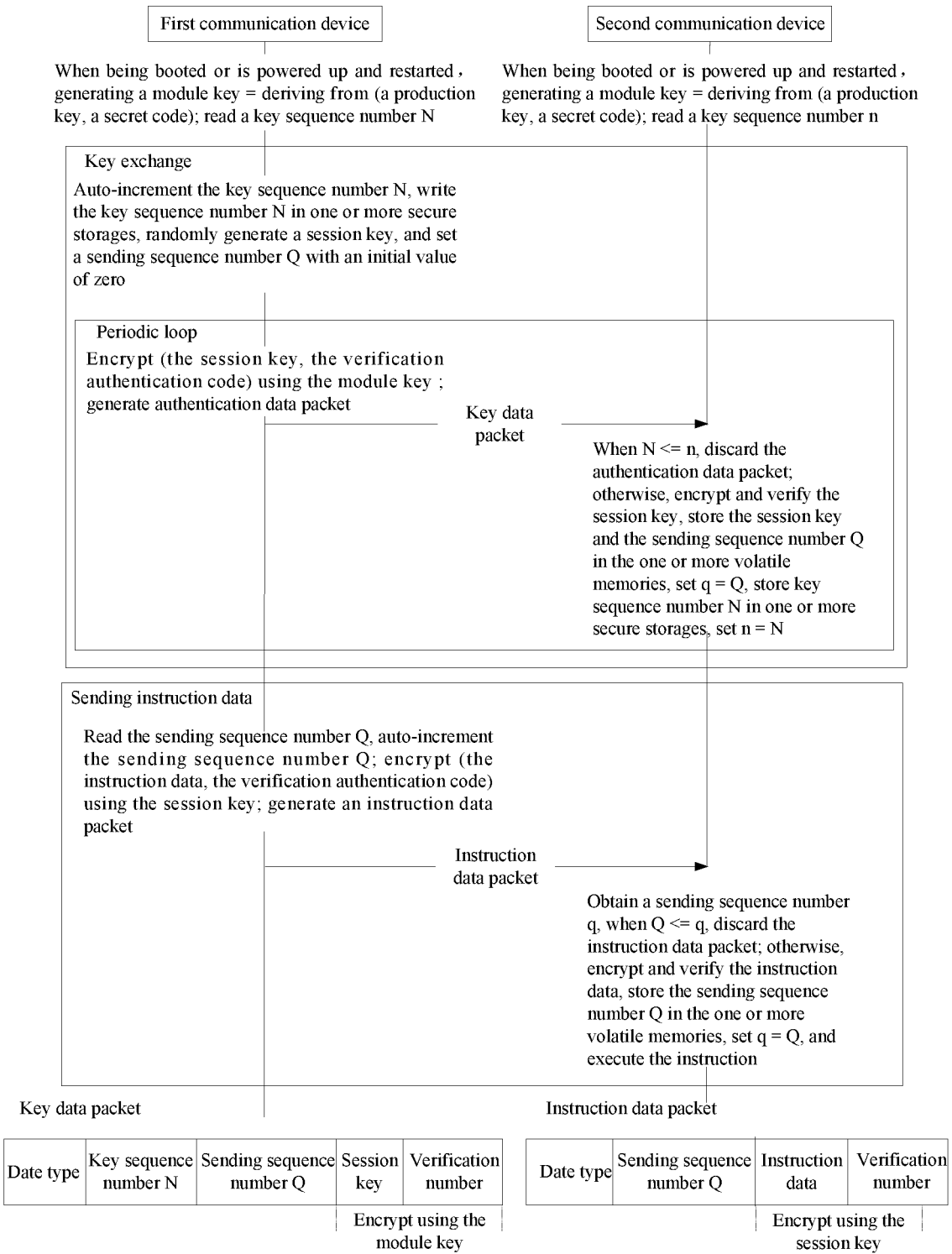
FIG. 4 is a schematic diagram of a data stream transmission process of the one-way communication system according to an embodiment of the secure communication method.

FIG. 4 is a schematic diagram of a data stream transmission process of the one-way communication system consistent with the secure communication method of the disclosure.

When the first communication device 1 is booted or is powered up and restarted, the module key 110 is generated according to the prestored product key 100 and the secret code 101 that is generated during the pairing process, and the key sequence number N 102 is obtained from the one or more secure storages 10. During the process of key exchange with the second communication device 2, the first communication device 1 auto-increments the obtained key sequence number N 102. For example, the key sequence number N 102 is increased by one every time data is sent, the auto-incremented key sequence number N 102 is written to the one or more secure storages 10, and the original value of N is replaced by the auto-incremented value of N. At the same time, the first communication device 1 randomly generates the session key 111 and sets the sending sequence number Q 112 with an initial value of zero. Furthermore, the first communication device 1 uses the module key 110 to encrypt or perform another computation on the session key 111 and the verification authentication code of the session key 111 to generate a key frame, generates the key data packet including the key frame, the key sequence number N 102, and the sending sequence number Q 112, and periodically sends the key data packet to the second communication device 2.

When the second communication device 2 is booted or is powered up and restarted, the module key 210 is generated according to the prestored product key 200 and the secret code 201 that is generated during the pairing process, and the key sequence number n 202 is obtained from the one or more secure storages 20. Upon receipt of the key data packet sent by the first communication device 1, the second communication device 2 determines whether N<=n. If N<=n, the packet is discarded. If N>n, the session key is decrypted and verified. The session key 111 and the sending sequence number Q 112 are stored in the one or more volatile memories 21 of the second communication device 2, and sets q=Q. The key sequence number N 102 is stored in the one or more secure storages 20 of the second communication device 2, such as the non-volatile memory, and sets n=N, thereby completing the key exchange process.

After the authentication, if the first communication device 1 and the second communication device 2 are not powered up and restarted, a sending process of the instruction data can be executed. The first communication device 1 obtains the sending sequence number Q 112 and auto-increments the sequence number Q 112, for example, increments the value of Q by one each time a message is sent or increments the value of Q by one every period of time. The first communication device 1 also uses the session key 111 to encrypt or perform another computation on the instruction data to be sent and the verification authentication code of the instruction data to generate the instruction data frame, generates the instruction data packet including the instruction data frame and the sending sequence number Q 112, and periodically sends the instruction data packet to the second communication device 2.

After receiving the instruction data packet, the second communication device 2 obtains the receiving sequence number q 212 from the one or more volatile memories 21 and determines whether Q<=q. If Q<=q, the instruction data packet is discarded. Otherwise, if Q>q, the instruction data is decrypted and verified, the sending sequence number Q 112 is stored in the one or more volatile memories 21, q=Q is set, and the instruction data is executed.

The key data packet includes the data type, the key sequence number N, the sending sequence number Q, the session key, and the verification authentication code. The session key and verification authentication code are encrypted using the module key, and the MAC code itself is not encrypted. Similarly, the instruction data packet includes the data type, the sequence number Q, the instruction data, and the verification authentication code. The instruction data and the verification authentication code are encrypted using the session key.

In some embodiments, the product key can be prestored in the one or more secure storages of the first communication device and the second communication device, such as a ROM, to prevent the attacker from reading the product key.

The pairing of the first communication device and the second communication device can generally take place in a safe environment to ensure the security of the secret code. Therefore, the confidentiality and security of the module key that is generated based on the product key and the secret code can be guaranteed. When the second communication device receives the data packet sent by the first communication device, and if N<=n and/or Q<=q, it indicates that the data packet may be repeatedly sent by the first communication device or sent by the attacker through the replay attack, such that the packet is discarded. When N>n and Q>q, the data packet can be processed, thereby ensuring the prevention of replay attacks during data transmission.

The key sequence number can be auto-incremented once each time the first communication device is powered up to regenerate the session key. Therefore, in order to ensure security, the key sequence number can be stored in the one or more non-volatile memories of the first communication device and the second communication device. The sending sequence number can be cleared when the session key is newly generated. Therefore, the sending sequence number can be stored in the one or more volatile memories of the first communication device and the second communication device.

In some embodiments, the key data packet can also include the data type, the key sequence number N, the sending sequence number Q, the session key, and the MAC code. In such a situation, the module key can be used to encrypt or preform a MAC computation on the session key, and the MAC code itself can be not encrypted. Similarly, the instruction data packet can include the data type, the sequence number Q, the instruction data, and the MAC code, and the session key can be used to encrypt or preform a MAC computation on the instruction data.

In the above embodiments, the authentication and instruction transmission systems in the one-way communication system are described. That is, the first communication device is the message sender and the second communication device is the message receiver. It can be appreciated by those skilled in the art that the technical solutions described in the above embodiments are also applicable to an asymmetric two-way communication system. For example, the first communication device can be the master and the second communication device can be the slave. In the asymmetric two-way communication system, the reliability of a communication from the master to the slave needs to be relatively high, while the reliability of a communication from the slave to the master can be relatively low. The communication processes described above with reference to FIGS. 2-4 can be referred to for, the communication from the master to the slave in the asymmetrical two-way communication system. The communication from the slave to the master is described below with reference to FIG. 5 and FIG. 6.

Figure 5:
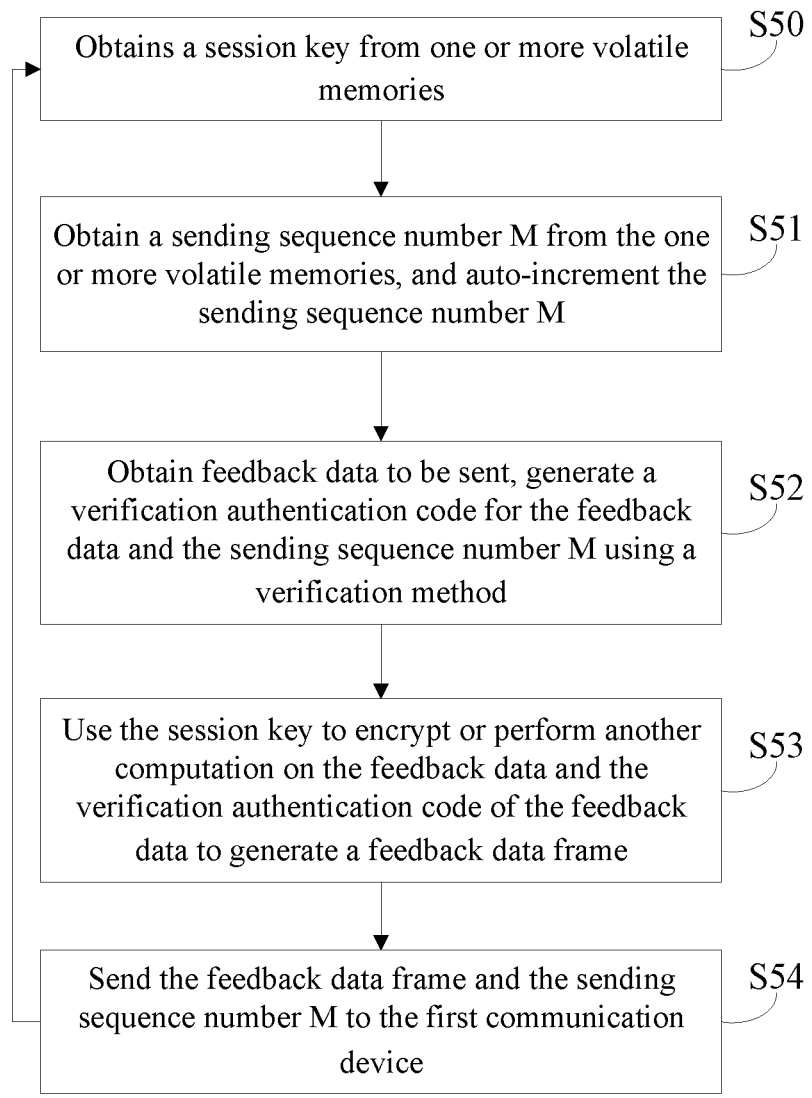
FIG. 5 is a flowchart of a method for sending feedback data from a slave to a master of an asymmetric two-way communication system according to an embodiment of the secure communication method.

FIG. 5 is a flowchart of a method for sending feedback data from a slave to a master of an asymmetric two-way communication system consistent with the secure communication method of the disclosure.

In some embodiments, the slave can be the second communication device 2. According to different needs, the execution sequence of the processes in the data processing method shown in FIG. 5 can be changed, and some processes can be omitted. It is not intended to limit the processes and sequence to those shown in FIG. 5.

At S50, the feedback data sending circuit 24 of the second communication device 2 obtains the stored session key 211 from the one or more volatile memories 21. The session key

211 can be received from the first communication device 1 using the method shown in FIG. 2.

At S51, the feedback data sending circuit 24 obtains a sending sequence number M from the one or more volatile memories 21, and auto-increments the sending sequence number M. The auto-incrementing method can be that the sending sequence number M is incremented by one every time data is sent, or increased by one every preset time period, such as every 50 millisecond or every 1 second.

At S52, the feedback data sending circuit 24 obtains feedback data to be sent, generates a verification authentication code for the feedback data and the sending sequence number M using a verification method. The verification method can include a message digest algorithm, such as various hashes, including the MD5, the SHA, or the like, a check code, such as CRC or the like, or a message authentication code.

At S53, the feedback data sending circuit 24 uses the session key 212 to encrypt or perform another computation on the feedback data and the verification authentication code of the feedback data to generate a feedback data frame.

At S54, the feedback data sending circuit 24 sends the feedback data frame and the sending sequence number M to the first communication device 1.

Figure 6:
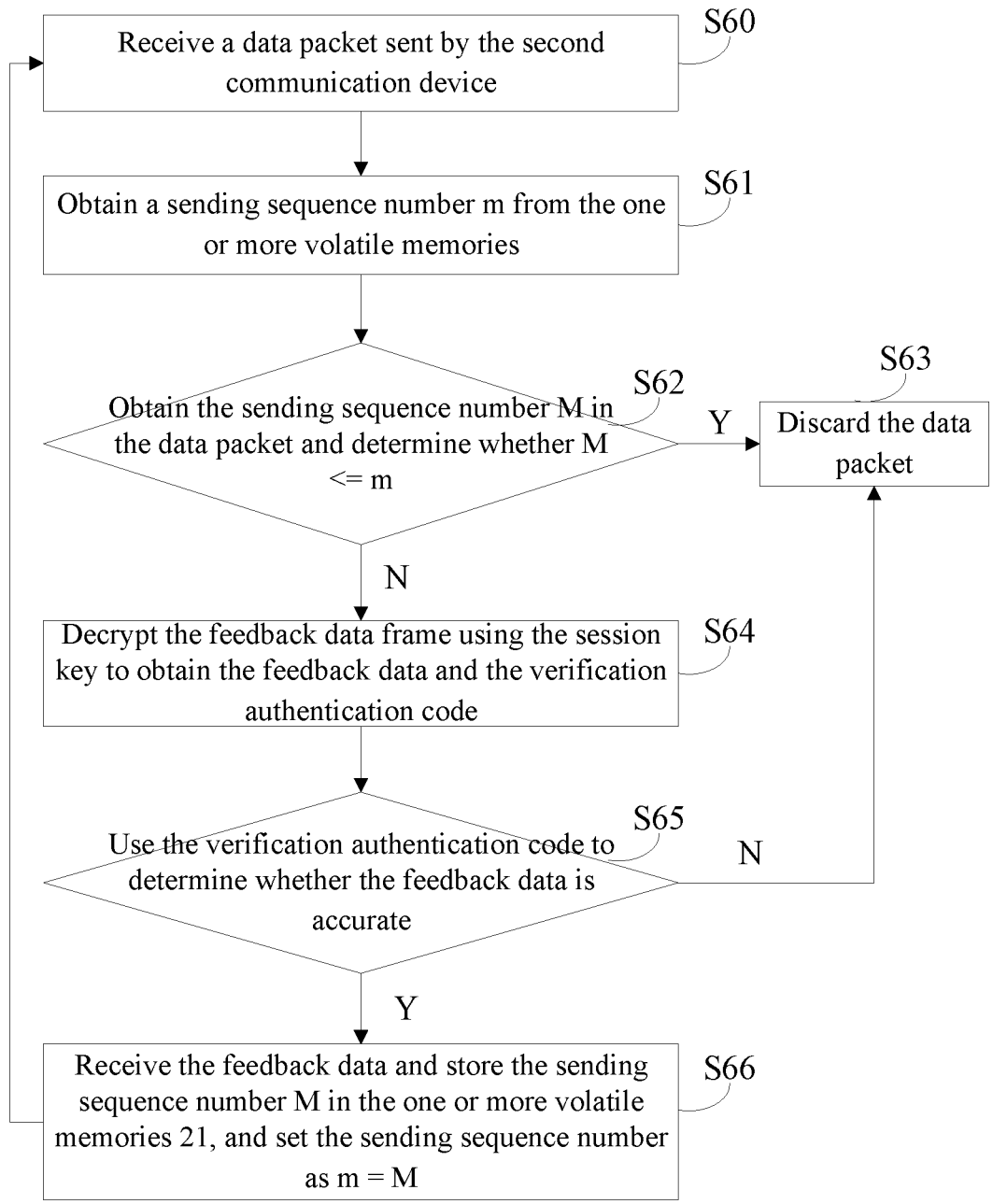
FIG. 6 is a flowchart of a method for receiving feedback data by the master from the slave of the asymmetric two-way communication system according to an embodiment of the secure communication method.

FIG. 6 is a flowchart of a method for receiving feedback data by the master from the slave of the asymmetric two-way communication system consistent with the secure communication method of the disclosure.

In some embodiments, the master can be the first communication device 1. According to different needs, the execution sequence of the processes in the data processing method shown in FIG. 6 can be changed, and some processes can be omitted. It is not intended to limit the processes and sequence to those shown in FIG. 6.

At S60, the feedback data receiving circuit 14 of the first communication device 1 receives the data packet sent by the second communication device 2.

At S61, the feedback data receiving circuit 14 obtains a sending sequence number m from the one or more volatile memories 11.

At S62, the feedback data receiving circuit 14 obtains the sending sequence number M in the data packet and determines whether M<=m.

If M<=m, at S63, the feedback data receiving circuit 14 discards the data packet.

If M>m, at S64, the feedback data receiving circuit 14 decrypts the feedback data frame using the session key 111 to obtain the feedback data and the verification authentication code.

At S65, the feedback data receiving circuit 14 uses the verification authentication code to determine whether the feedback data is accurate. If the feedback data is not accurate, the above process at S63 is performed, at which the feedback data receiving circuit 14 discards the data packet.

If the feedback data is accurate, at S66, the feedback data receiving circuit 14 receives the feedback data and stores the sending sequence number M in the one or more volatile memories 21, and sets the sending sequence number as m=M.

It is intended that the specification and examples be considered as exemplary only and not to limit the scope of the disclosure. Those skilled in the art will be appreciated that any modification or equivalents to the disclosed embodiments are intended to be encompassed within the scope of the present disclosure.

What is claimed is:

1. A secure communication method comprising:
    obtaining a secret code generated in response to a first communication device being paired with a second communication device;
    obtaining a prestored product key;
    generating a module key based on the secret code and the product key;
    randomly generating a session key;
    obtaining a key sequence number;
    auto-incrementing the key sequence number;
    setting a sending sequence number with an initial value of zero;
    generating a key frame by performing a computation on the session key and a verification authentication code of the session key using the module key; and
    sending a data packet including the key frame, the key sequence number, the sending sequence number, and a data type to the second communication device.

2. The method of claim 1, wherein:
    the first communication device is a master and the second communication device is a slave.

3. The method of claim 2, wherein:
    the first communication device is a flight controller and the second communication device is an unmanned aerial vehicle (UAV) or one or more circuits of the UAV.

4. The method of claim 3, wherein:
    the one or more circuits of the UAV includes one or more cameras and/or one or more gimbals.

5. The method of claim 1:
    wherein the data packet is a first data packet and the data type is a first data type;
    the method further comprising:
        repeating the following until the first communication device is powered up and restarted:
            obtaining the sending sequence number;
            auto-incrementing the sending sequence number;
            obtaining instruction data to be sent;
            generating an instruction data frame by encrypting the instruction data and a verification authentication code of the instruction data using the session key; and
            sending a second data packet including the instruction data frame, the sending sequence number, and a second data type to the second communication device, the second data type indicating that the second data packet is an instruction data packet.

6. The method of claim 1, wherein:
    the product key is burned in one or more secure storages of the first communication device.

7. The method of claim 1, wherein:
    the module key is generated by performing a derivation algorithm on the secret code and the product key, the derivation algorithm including at least one of an encryption or a Message Authentication Code.

8. The method of claim 1, wherein:
    the session key is dynamically generated by using a random number generator.

9. The method of claim 1, wherein auto-incrementing the key sequence number includes:
    incrementing a value of the key sequence number by one each time the session key is generated.

10. The method of claim 1, wherein auto-incrementing the sending sequence number includes:

incrementing a value of the sending sequence number by one each time data is sent to the second communication device or every preset time period.

11. The method of claim 1, wherein performing the computation on the session key and the verification authentication code of the session key using the module key includes an encryption and/or a Message Authentication Code.

12. The method of claim 1, wherein:
the module key, the sending sequence number, and the session key are stored in one or more volatile memories of the first communication device; and
the secret code and the key sequence number are stored in one or more non-volatile memories of the first communication device.

13. The method of claim 5, wherein:
an initial value of the sending sequence number is zero;
the sending sequence number monotonically increases in response to the session key remaining unchanged; and
the sending sequence number is reset to zero in response to the session key being changed.

14. The method of claim 13, wherein:
the session key and the sending sequence number are stored in one or more volatile memories of the first communication device.

15. A communication device comprising:
an authentication sending circuit configured to:
obtain a secret code generated in response to a first communication device being paired with a second communication device;
obtain a prestored product key;
generate a module key based on the secret code and the product key;
randomly generating a session key;
obtain a key sequence number,
auto-increment the key sequence number,
set a sending sequence number with an initial value of zero,
generate a key frame by performing a computation on the session key and a verification authentication code of the session key using the module key; and
send a data packet to the second communication device, the data packet including the key frame, the key sequence number, the sending sequence number, and a data type.

16. The device of claim 15, wherein:
the communication device is an unmanned aerial vehicle (UAV), a circuit of the UAV, or a flight controller configured to control the UAV.

17. The device of claim 15, wherein:
the communication device is a message sender and a message receiver.

* * * * *